United States Patent [19]

Fukuma et al.

[11] 4,322,669

[45] Mar. 30, 1982

[54] DEVICE FOR CONTROLLING THE FEED OF MACHINE TOOLS

[75] Inventors: Nobuo Fukuma; Yoshito Kato, both of Aichi; Takao Terui, Saitama, all of Japan

[73] Assignees: Toyota Jidosha Kogyo Kabushiki Kaisha, Aichi; Yaskawa Electric Mfg. Co. Ltd., Fukuoka, both of Japan

[21] Appl. No.: 54,692

[22] Filed: Jul. 5, 1979

Related U.S. Application Data

[63] Continuation-in-part of Ser. No. 760,110, Jan. 17, 1977, abandoned.

[30] Foreign Application Priority Data

Jan. 16, 1976 [JP] Japan .................................. 51-4530

[51] Int. Cl.³ ............................................ G05B 19/25
[52] U.S. Cl. .................................... 318/571; 318/332; 318/432; 318/626; 318/163; 318/467
[58] Field of Search .............. 318/332, 432, 626, 571, 318/163, 164, 467

[56] References Cited

U.S. PATENT DOCUMENTS

| | | | |
|---|---|---|---|
| 3,191,205 | 6/1965 | Gilbert | 318/571 |
| 3,733,961 | 5/1973 | Reynolds | 318/467 |
| 3,735,226 | 5/1973 | Pittner | 318/432 |
| 3,857,079 | 12/1974 | Wake et al. | 318/626 |
| 3,955,130 | 5/1976 | Graf | 318/332 |
| 4,019,107 | 4/1977 | Dixon et al. | 318/432 |
| 4,182,979 | 1/1980 | Douglas et al. | 318/332 |

*Primary Examiner*—J. V. Truhe
*Assistant Examiner*—Eugene S. Indyk
*Attorney, Agent, or Firm*—Koda and Androlia

[57] ABSTRACT

An apparatus for controlling a DC motor driven screw feed which moves the table of a machine tool into prescribed positions including a plurality of limit switches which detect the position of the table, a rate change control circuit which receives signals from the limit switches and changes the rate of revolution of the DC motor when the table has reached prescribed rate change positions and a current limiting circuit which supplies the DC motor with a prescribed constant current and keeps the output torque of the DC motor at a prescribed level when the table has reached a prescribed dwell position.

2 Claims, 5 Drawing Figures

DEVICE FOR CONTROLLING THE FEED OF MACHINE TOOLS

CROSS-REFERENCES TO RELATED APPLICATIONS

This is a continuation-in-part of Application Ser. No. 760,110 filed Jan. 17, 1977 now abandoned.

BACKGROUND OF INVENTION

1. Field of Invention

This invention relates to apparatuses for controlling the feed of machine tools and more particulary to apparatuses for controlling the feed of machine tools which employ a DC motor.

2. Prior Art

Generally, the table which moves the main shaft or work table, etc., of a machine tool into prescribed positions is driven by a hydraulic cylinder system. Hydraulic cylinder systems have several advantages, such as being relatively easy to control, being able to produce a sizeable driving force, etc., which make them suitable for generating thrust for feed tables. However, due to various factors such as temperature fluctuations and use of compressable fluids, etc., feed control stability is poor. This poor stability in feed control leads to decreased productivity and shorter tool life. Furthermore, these systems also suffer from other drawbacks, including a number of environmental problems such as oil leaks, noise, etc.

Systems in which a motor drive is used to move a table have been proposed as an alternative to such conventional hydraulic cylinder systems. These motor driven systems, however, do not have all the advantages offered by conventional hydraulic cylinder systems. Particularly in the case of AC motor driven systems, it is difficult to change the rate of revolution of the motor. These systems have therefore had to employ complicated mechanisms such as gear boxes, etc. Such complicated mechanisms have increased the cost of such systems. Furthermore, in cases where the table is stopped in prescribed positions, it is difficult in these AC motor driven systems to hold the table securely in its stopped position. Accordingly, these systems have suffered from several drawbacks, such as poor precision in returning the table from the forward end, shortened tool life due to mechanical abrasion, etc.

The use of DC motors is desirable from the standpoint of ease of rate control, but these prior art DC motor driven systems suffer from the same drawbacks as the previously described AC motor driven systems in regard to their table holding action.

This invention has been designed with the above described conventional problems in mind.

SUMMARY OF THE INVENTION

Accordingly, it is a general object of the present invention to provide an apparatus for controlling the feed of machine tools which makes it possible to change the rate of feed easily and freely by means of DC motor control.

It is another object of the present invention to provide an apparatus for controlling the feed of machine tools which make it possible to hold the table securely in prescribed positions.

It is yet another object of the present invention to provide an apparatus for controlling the feed of machine tools which is simple and relatively low in cost.

In keeping with the principles of the present invention, the objects are accomplished by a unique apparatus for controlling a DC motor driven screw feed which moves the table of a machine tool into prescribed positions including a plurality of limit switches which detect the position of the table, a rate change control circuit which receives signals from the plurality of limit switches and changes the rate of revolution of the DC motor when the table has reached prescribed rate change positions and a current limiting circuit which supplies the DC motor with a prescribed constant current and keeps the output torque of the DC motor at a prescribed level when the table has reached a prescribed dwell position.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which:

FIG. 5 is a circuit diagram of the DC control circuit of FIG. 2.

DESCRIPTION OF THE INVENTION

Figure 1:
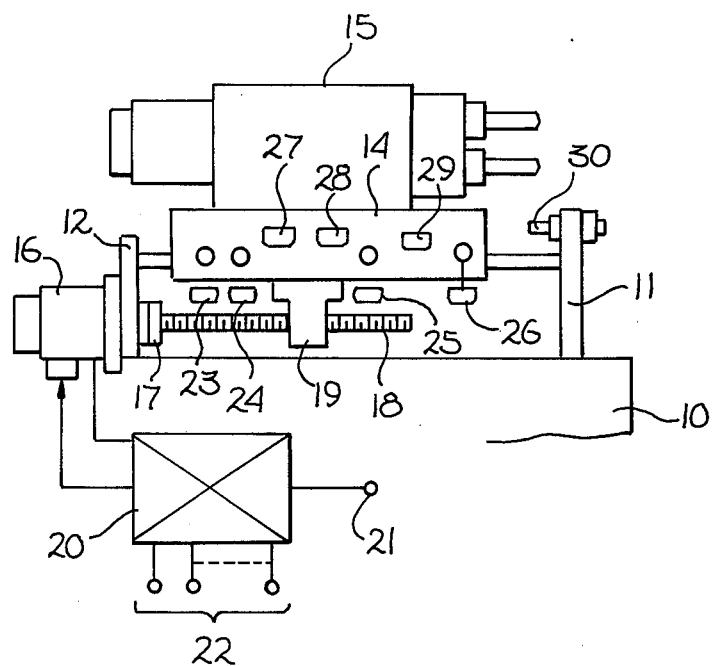
FIG. 1 is a basic front view of a screw feed device for a machine tool which is equipped with a feed control apparatus in accordance with the teachings of the present invention.

Referring more particularly to the drawings, shown in FIG. 1 is a screw feed device for a machine tool in which a feed control apparatus in accordance with the teachings of the present invention has been provided. In FIG. 1, supporting side plates 11 and 12 are provided on the base 10 of the machine tool. A feed guide 13 is coupled to the supporting side plates 11 and 12. Table 14 slidably engages with feed guide 13 in a conventional manner so that it can slide to the left and right with regard to FIG. 1. A shaft unit 15 is coupled to table 14, as indicated by the broken line. DC motor 16 is coupled to supporting side plate 12 and feed screw 18 is coupled to the driving shaft of DC motor 16 by a coupling 17. Feed screw 18 engages with a feed nut 19 attached to table 14 so that table 14 is caused to move when DC motor 16 rotates its driving shaft.

DC motor 16 is supplied with electrical driving energy from terminal 21 via a control circuit 20. The rate of revolution of the DC motor 16 is controlled by the control circuit 20. Control circuit 20 operates in response to table position signals sent from a group of terminals 22. Limit switches 23, 24 and 26 are provided adjacent to table 14. On-off signals from limit switches 23, 24, 25 and 26 are provided to the group of terminals 22. The limit switches 23, 24, 25 and 26 are operated by actuators 27, 28 and 29 which are fixed to table 14. A stopper 30 is fastened to side supporting plate 11 in a predetermined position such that the table 14 will stop at the position where it contacts the tip of stopper 30.

Figure 2:
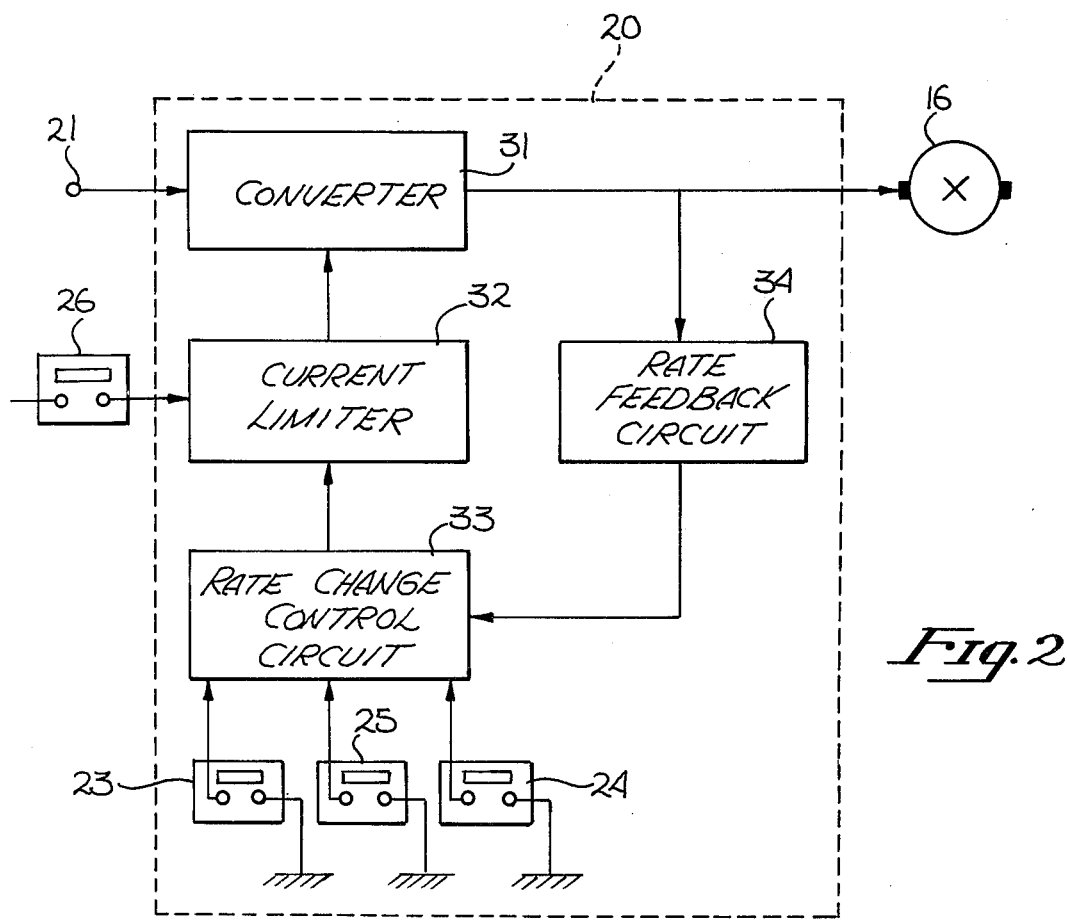
FIG. 2 is a block diagram of the DC control circuit in FIG. 1.

Referring to FIG. 2, shown therein is the essential components of the control circuit 20. In this embodiment, the DC motor is a series wound DC motor. The power source terminal 21 is supplied with electrical power in the form of two phase or three phase AC current. The AC current is converted into a prescribed DC current by a converter 31 and is supplied to DC motor 16. The output of converter 31 is controlled by a current limiting circuit 32 and a rate change control circuit 33. The current limiting circuit 32 takes precedence over the rate change control circuit 33 in controlling the output current of the converter 31. In addition to protecting the circuit as a whole, current limiting circuit 32 also receives a signal from the limit switch 26 and sends a control signal to the converters 31 so that the DC motor 16 is supplied with a first predetermined constant current when the table 14 has reached a position immediately before the predetermined dwell position. The remaining limit switches 23, 24 and 25 are electrically coupled to the rate change control circuit 33 and send signals to the converter 31 in accordance with position of the table 14. Furthermore, in this case the current limiting circuit 32 is not only for the protection of the circuit as a whole, but also limits the first predetermined constant current to a magnitude sufficient to maintain operation during cutting, fast feed and fast return in general. However, once the current limiting switch 32 has received a signal from the limit switch 26, it limits the second predetermined constant current to a level lower than the first predetermined constant current so that dwell is obtained. Furthermore, a rate feedback circuit 34 is coupled to the rate change control circuit 33. This feeds back the output of converter 31 so that the rate of feed of table 14 is determined as ordered.

Figure 3:
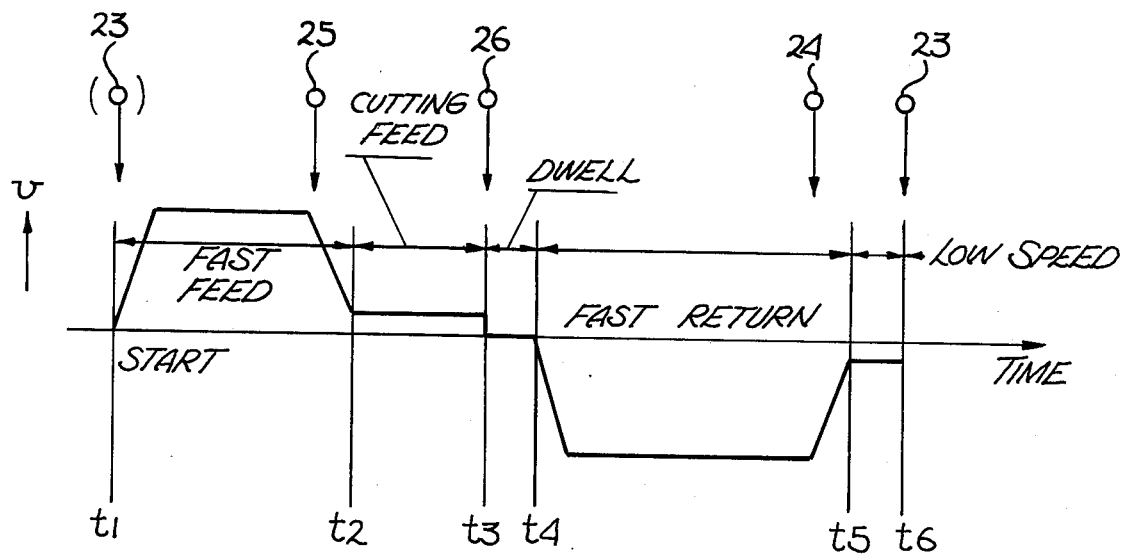
FIG. 3 is a diagram of the rate of revolution of the DC motor which illustrates the screw feed operation of the present invention.
Figure 4:
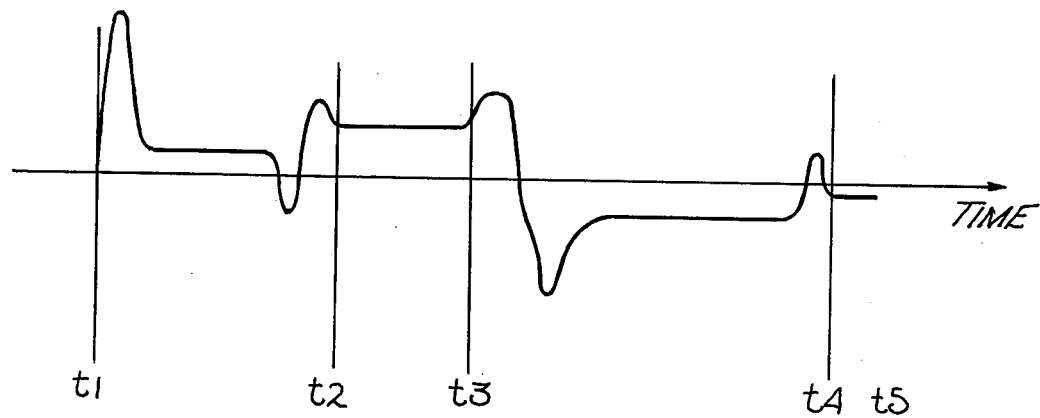
FIG. 4 is a diagram of the torque of the DC motor during operation of the shaft feed.

The description of the operation which follows is described with reference to FIGS. 3 and 4 and describes the operation as the table is caused to move through one cycle between the prescribed stop positions. At the start of the cycle, table 14 has been moved to the left and is stopped in a position where the actuator 27 has contacted the limit switch 23. When the control circuit 20 receives a start signal, not shown in the figures, a maximum rate signal is sent to the converter 31 and fast feed operation occurs from the starting point $t_1$ until $t_2$, as shown in FIG. 3. As is clear from the torque characteristics shown in FIG. 4, the starting torque of DC motor 16 is at a maximum value at the starting point $t_1$. During the regular fast feed, the torque drops to a uniform value.

During the advance of the table 14, the limit switches 23 and 24 are regularly switched off by the actuators 27 and 28. However, this switching action does not cause any signals to be sent to the converter 31. Accordingly, table 14 is maintained at a uniform speed rate. The actuator 28 advances with table 14 and when limit switch 25 is switched on by actuator 28, a rate reduction signal is sent to the converter 31 and the rate of feed is decreased to the desired cutting speed at $t_2$. The rate changing action caused by the limit switches is caused by changing the rate order voltage supplied to the rate change control circuit 33. Specifically, the prescribed rate order voltages provided inside the rate change control circuit 33 are selected by switching on the limit switches 23, 24 and 25. Converter 31 is controlled by these rate order voltages. In FIGS. 3 and 4, the interval between $t_2$ and $t_3$ indicates cutting. Processing of the work begins at $t_2$ and the work is cut at a low speed until $t_3$.

The position at which cutting is terminated is detected when the limit switch 26 is switched on by the actuator 29. The interval between $t_3$ and $t_4$ indicates the dwell which occurs at the position at which cutting is terminated. During the dwell, table 14 is stopped by stopper 30 and the DC motor 16 is supplied with a prescribed control current from the current limiting circuit 32. Accordingly, a holding torque which is higher than the cutting torque during the interval between $t_3$ and $t_4$ in FIG. 4 is applied during the period of rest which occurs during the dwell shown in FIG. 3. As a result, the table 14 of this invention is securely held in its stopped position and movement or oscillation of the table 14 is prevented during dwell, thereby making increased precision possible. In the embodiment shown in the figures, the dwell time is determined by a timer, etc., provided within the current limiting circuit 32. After the prescribed period of time has elapsed at $t_4$, the DC motor 16 is supplied with a reverse current and the cycle enters the return stroke. During the return stroke, high speed revolution of the DC motor 16 is selected.

When the limit switch 24 is switched on by actuator 27, the rate of revolution of the DC motor 16 is decreased by means of the previously described changing of the rate order voltage and table 14 goes into low speed motion. Then, when the limit switch 23 is switched on by the actuator 27, the voltage supplied to DC motor 16 is cut off and the feed cycle of table 14 is complete.

In the embodiment shown in the figures, the DC motor 16 is a series wound DC motor whose rate of revolution is controlled by means of magnetic field control and voltage control. However, a shunt motor or externally excited DC motor could also be utilized in this invention. Furthermore, it would also be possible to utilize series resistance control or other rate control methods. In addition, the essential components of the control circuit 20 are well known in the art. Also, the coupling 17 could be replaced by a simple pair of gears and the rate order voltages could be obtained by means of voltage dividers. Furthermore, the timer which sets the dwell time could also be provided externally.

FIG. 5 is an electrical circuit diagram in which the blocks shown in FIG. 2 are more specifically illustrated utilizing prior art type circuitry. The converter 31 includes: a transformer 35 connected to a power source terminal 21, diodes 36, 37, 38 and 39, a smoothing condenser 40, transistors 41, 42, 43 and 44 assembled into a bridge shape so as to determine the rotating direction of the DC-motor 16, resistors 45 and 46 inserted on the side of the emitters of the transistors 42 and 44, a triangle wave generator 47, and No. 1 and No. 2 drivers 48 and 49 for emitting signals to determine the rotating direction and rotational speed of the motor 16 based on an output from the triangle wave generator 47 and an output from the current limiting circuit 32.

The current limiting circuit 32 includes a switch 50, a current detecting amplifier 51 for detecting output currents from the convertor 31 at the resistors 45 and 46, a current amplifier 52 sending out an output according to the deviation between the signal from a rate change control circuit 33 which is given through the switch 50 and the signal from a current detecting amplifier 51 to No. 1 and No. 2 drivers 48 and 49 and a variable resistor 53 and a resistor 54 for restricting the output from the current amplifier 52 to a predetermined value. The switch 50 is operationally associated with the limit switch 26 and adapted to be turned "OFF" when the limit switch 26 is turned "ON". A variable resistor 55 is used to set the value of current at the time of dwell. The rate change control circuit 33 includes: variable resistors 56, 57 and 58 for generating a rate order voltage, a rate amplifier 60 for receiving a rate order voltage selected at limit switches 23, 24 and 25 through a resistor 61. The rate feedback circuit 34 includes a tachometer generator 63 connected to the motor 16. In this circuit, a rate order voltage selected by the limit switches 23, 24 and 25 is fed to No. 1 and No. 2 drivers 48 and 49 through the rate amplifier 60, switch 50 and current amplifier 52, whereby the DC-motor 16 is rotated. The rotational speed of the motor 16 is detected by the tachometer generator 63 and the detected signal of the rotational speed is fed back to the rate amplifier 60 so that the rotational speed of the motor 16 can be controlled in compliance with the order. Then, the output of the current amplifier 52 is restricted to a predetermined value by the variable resistor 53. If the limit switch 26 is turned "ON" when the table 14 reaches the position of dwell, then the switch 50 is turned "OFF" and a voltage from the variable resistor 55 is fed to the current amplifier, and hence, the output from the current limiting circuit 32 is restricted to a lower value.

As is clear from the above description, the feed control device provided by this invention makes it possible to freely select the rate of feed of the table 14 by controlling the rate of revolution of the DC motor. Operations such as fast feed, cutting feed, fast return, etc. are easily accomplished. Furthermore, it should be apparent that rate control using a DC motor can be obtained with an extremely simple circuit hookup as described herein. In addition, it is possible in this invention to apply any desired pressure to the table during dwell so that high table stability can be obtained.

In all cases it is understood that the above described embodiment is merely illustrative of but one of the many possible specific embodiments which can represent the applications of the principles of the present invention. Numerous and varied other arrangements can be readily devised by those skilled in the art without departing from the spirit and scope of the invention.

We claim:

1. An apparatus for controlling a DC motor driven screw feed which moves a table of a machine tool into predetermined positions, said apparatus comprising:
    a DC motor for moving the table;
    a plurality of limit switches provided adjacent to said table for generating signals corresponding to the positions of said table;
    a rate change control circuit which receives the signals from said limit switches and changes a rate of revolution of said DC motor when said table reaches predetermined rate change positions for cutting, fast feed and fast return;
    a dwell limit switch provided adjacent to said table for generating a signal to decrease a current limit value from a first limited value to a second limited value when said table has reached a position immediately before a predetermined dwell position;
    a stationary rigid stopper securely fixed to a base of said machine tool for abutting on said table directly to stop said table at said predetermined dwell position, said stopper being provided separately from said dwell limit switch; and
    a current limit circuit receiving the signals from said rate change control circuit and said dwell limit switch to supply said DC motor with a current, said current limit circuit controlling a value of said current equal to or lower than said first limited value sufficient for cutting, fast feed and fast return until said table operates said dwell limit switch and controlling the value of said current equal to or lower than said second limited value after said table operates said dwell limit switch, and maintaining the value of said current of said second limited value for a predetermined period of time for causing dwell pressure between said table and said stopper after said table abuts on said stoppers, said first limited value being equal to or lower than a value for protecting the whole circuit of said apparatus, said second limited value being lower than said first limited value and sufficient for said table to dwell.

2. An apparatus according to claim 1 further comprising a plurality of actuators provided on said table for directly actuating said rate change and dwell limit switches.

* * * * *